United States Patent
Singh et al.

(10) Patent No.: US 6,848,223 B2
(45) Date of Patent: Feb. 1, 2005

(54) SEISMIC CASK STABILIZATION DEVICE

(75) Inventors: Krishna P. Singh, Palm Harbor, FL (US); A J. Soler, Cherry Hill, NJ (US)

(73) Assignee: Holtec International Inc., Marlton, NJ (US)

( * ) Notice: Subject to any disclaimer, the term of this patent is extended or adjusted under 35 U.S.C. 154(b) by 77 days.

(21) Appl. No.: 10/061,633

(22) Filed: Jan. 30, 2002

(65) Prior Publication Data

US 2003/0144568 A1 Jul. 31, 2003

(51) Int. Cl.[7] .............................. E04B 1/98; E04H 9/02
(52) U.S. Cl. .................... 52/167.4; 52/167.1; 52/167.9; 248/638; 248/676; 248/154
(58) Field of Search .............................. 52/167.4, 167.9, 52/167.1; 248/638, 676, 154

(56) References Cited

U.S. PATENT DOCUMENTS

| | | | | |
|---|---|---|---|---|
| 4,326,920 A | | 4/1982 | Facha et al. | |
| 4,599,834 A | | 7/1986 | Fujimoto et al. | |
| 4,766,706 A | * | 8/1988 | Caspe | 52/1 |
| 5,181,356 A | * | 1/1993 | Sul | 52/167.2 |
| 5,195,716 A | * | 3/1993 | Tyler | 248/632 |
| 5,612,543 A | * | 3/1997 | Wenner et al. | 250/507.1 |
| 5,753,925 A | | 5/1998 | Yamanaka et al. | |
| 5,862,195 A | | 1/1999 | Peterson | |
| 6,126,136 A | * | 10/2000 | Yen et al. | 248/560 |
| 6,364,274 B1 | * | 4/2002 | Omi et al. | 248/562 |
| 6,474,030 B1 | * | 11/2002 | Ueda | 52/292 |
| 6,505,806 B1 | * | 1/2003 | Glaesener | 248/638 |

* cited by examiner

Primary Examiner—Carl D. Friedman
Assistant Examiner—Nahid Amiri
(74) Attorney, Agent, or Firm—Michael B. Fein, Esq.; Brian L. Belles, Esq.; Cozen O'Connor, P.C.

(57) ABSTRACT

An apparatus and method for stabilizing a spent nuclear fuel containment cask so as to prevent tipping under design basis earthquake conditions. In one aspect, the apparatus comprises a lamina and a slid plate in surface contact with the lamina, forming a slidable interface; wherein the slidable interface has a coefficient of friction within a range resulting in an acceptable level of net horizontal displacement of a cask resting on the apparatus under design basis earthquake conditions.

20 Claims, 6 Drawing Sheets

Figure 1 : Prior Art

Figure 5: Net Horizontal Displacement of a Cask v. Coefficient of Friction of Slidable Interface

SEISMIC CASK STABILIZATION DEVICE

BACKGROUND OF THE INVENTION

1. Field of Invention

This invention relates to the field of storing and transferring spent nuclear fuel and specifically to a method and apparatus for ensuring that casks used to store and transfer spent nuclear fuel do not tip over during seismic events.

2. State of the Art

In the operation of nuclear reactors, it is customary to remove fuel assemblies after their energy has been depleted down to a predetermined level. Upon removal, this spent nuclear fuel is still highly radioactive and produces considerable heat, requiring that great care be taken in its packaging, transporting, and storing. In order to protect the environment from radiation exposure, spent nuclear fuel is both transported and stored in large cylindrical containers called casks. A transfer cask is used to transport spent nuclear fuel from location to location while a dry storage cask is used to store spent nuclear fuel for a determined period of time.

In performing their respective functions, there are several steps in which a dry storage cask and a transfer cask must be arrayed in a vertical orientation. Steps such as welding a multi-purpose canister (MPC) lid, removing water from the MPC, and backfilling the MPC with helium, require several hours during which plant personnel must work in close proximity to a transfer cask while it is in a vertically oriented position. A transfer cask has a sizable footprint (about 8 feet) in relation to its height (about 16 feet), and is therefore quite adequate to stand in a freestanding configuration to perform the required operations at most plants. However, at certain nuclear plants the postulated design basis earthquake (DBE), particularly in areas of high seismic activity, creates the danger that a vertically oriented cask can tip over during a seismic event. This is a matter of credible safety concern.

As a result of this danger, nuclear plants are required to erect a temporary restraint system if a cask is found to tip over in analytical simulation of the effects of the postulated design basis earthquake. Because of the great mass and bulk of the structures involved (e.g. a loaded cask can typically weigh nearly 250,000 lbs), the restraint system is a bulky structure as well. As such, building and installing such large structures to protect the cask from tipping over during loading operations is very costly. Furthermore, because all of the loading steps cannot occur at one location, more than one temporary restraint system is typically required to protect a cask from tipping over if an earthquake were to occur during the fuel loading operations.

In addition to cost, installing the restraint systems inside the plants entails radiation dose to personnel during their erection, and even more so during fuel loading because of the reduction in access introduced by the presence of the restraint structure. It is estimated that the time that plant personnel must spend loading and "prepping" an MPC is at least doubled due to the presence of the restraint system.

SUMMARY OF THE INVENTION

These problems and inadequacies in the art are solved by the present invention which in one aspect is an apparatus for stabilizing a spent nuclear fuel containment cask so as to prevent tipping under design basis earthquake conditions comprising a lamina and a slide plate in surface contact with the lamina, forming a slidable interface.

The slidable interface has a coefficient of friction within a range resulting in an acceptable level of net horizontal displacement of a cask, the cask resting on the apparatus under design basis earthquake conditions. The coefficient of friction of the slidable interface is controlled by changing the material of which either the lamina, slide plate, or both are constructed. In the preferred embodiment, the slide plate is made of austenitic stainless steel and the lamina is constructed of a metallic or polymeric material. The slide plate can be the bottom surface of the cask, a cover plate on which the cask may be placed, or a bottom plate below the lamina.

In one simulated design basis earthquake, the range of coefficient of friction of the slidable interface can be 0.12 to 0.34 for an acceptable level of net horizontal displacement of 20 inches without tipping a cask having given design parameters. The total thickness of the apparatus, measured from a top surface of the slide plate to a bottom surface of the lamina, can be less than three inches. The slide plate and the lamina can be rectangular or circular. Moreover, the slide plate can have an inverted collar for keeping the slidable interface free of contaminants.

Preferably, when the slide plate is a cover plate and a cask is placed on the apparatus, lateral movement of the cask with respect to the cover plate is restricted by mechanically fastening the cask to the cover plate, providing a stopping means, or ensuring that a coefficient of friction between the cask and cover plate is greater than the coefficient of friction at the slidable interface.

In the preferred embodiment, the slide plate is a cover plate on top of the lamina having a bottom surface and the apparatus further comprises a floor plate having a top surface and a bottom surface, the top surface of the floor plate being in contact with the bottom surface of the lamina. In such an embodiment, it is also preferable to restrict lateral movement of the lamina with respect to the floor plate by mechanically fastening the lamina to the floor plate, providing a stopping means, or ensuring that a coefficient of friction between the lamina and floor plate is greater than the coefficient of friction of the slidable interface. It is also preferable to restrict lateral movement of the floor plate with respect to a surface upon which the apparatus is placed by mechanically fastening the floor plate to the surface upon which the apparatus is placed, providing a stopping means, or ensuring that a coefficient of friction between the floor plate and the surface upon which the apparatus is placed is greater than the coefficient of friction of the slidable interface.

In another aspect, the invention is a method of stabilizing a cask during seismic events comprising providing an apparatus as described above and positioning a cask having a bottom and a top on the apparatus so that the bottom of the cask rests on the slide plate. The range of coefficient of friction is determined for an acceptable level of net horizontal displacement of a cask under design basis earthquake conditions. For one typical cask embodiment, the range of coefficient of friction of the slidable interface is 0.12 to 0.34 when the acceptable level of net horizontal displacement is 20 inches.

BRIEF DESCRIPTION OF THE DRAWINGS

FIG. 8 is cross-sectional side view of an embodiment of the cask stabilization device having bolts to restrict sliding at particular interfaces.

DETAILED DESCRIPTION

As stated above, spent nuclear fuel is stored and transferred in cylindrical containers called casks. In performing their intended functions, cylindrical casks must frequently be in a vertically oriented position. In order to avoid radiation exposure to the environment, it is imperative that these casks do not tip over once they are loaded or being loaded with spent nuclear fuel. One such event that can cause a cask to tip over is a seismic event (i.e. an earthquake). If a cask having specific design parameters (i.e. weight, center of gravity, diameter of base, etc.) tips over in analytical simulation of the effects of a postulated earthquake (i.e. a design basis earthquake), then some type of restraint system is required to eliminate this danger.

Figure 1:
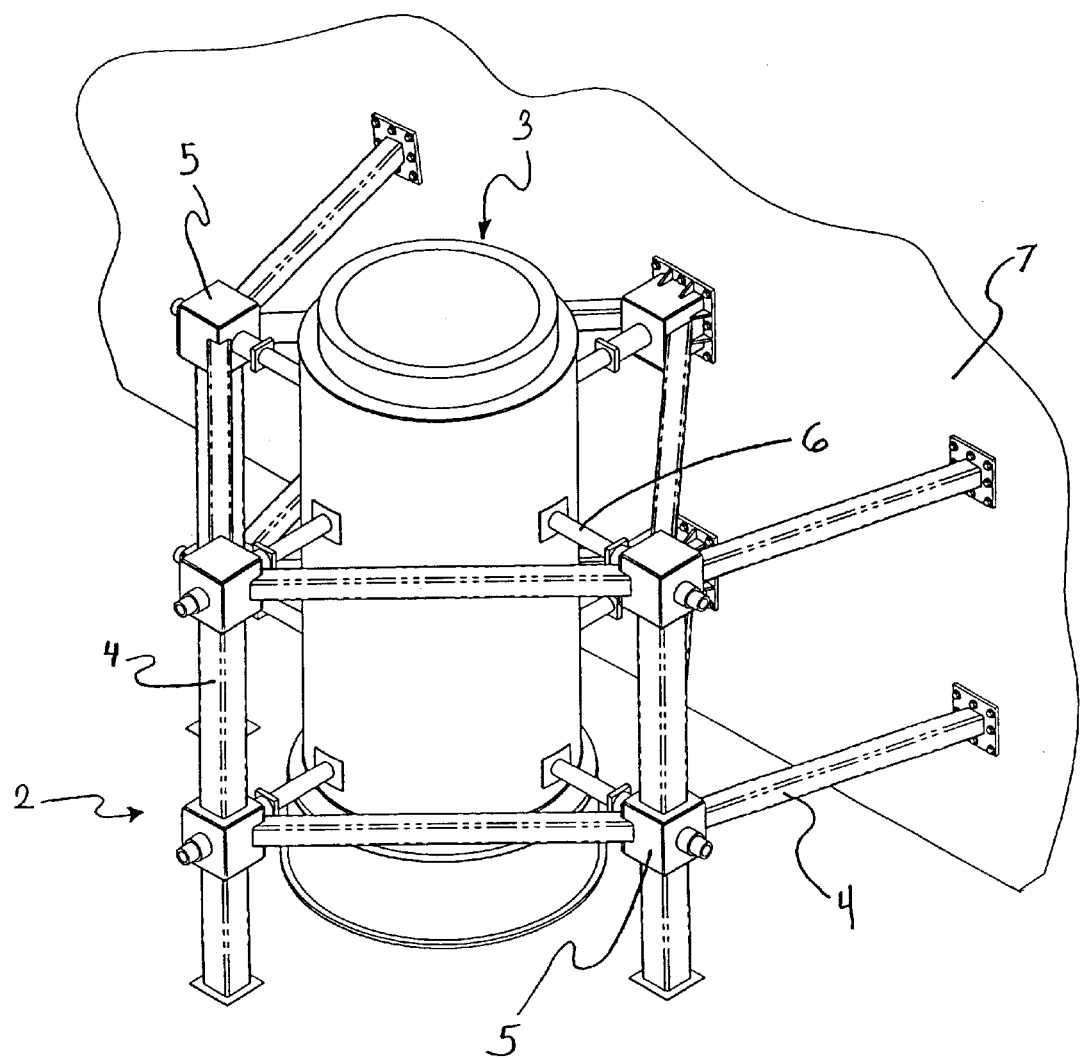
FIG. 1 illustrates a prior art mechanical restraint system for stabilizing casks during seismic events.

FIG. 1 illustrates a typical prior art restraint system 2 used to stabilize a vertically oriented cask 3. Restraint system 2 typically consists of a plurality of support beams 4, joints 5, and cask engaging arms 6. As can be seen from FIG. 1, prior art restraint system 2 is bulky and obstruct access to the cask 3. Moreover, restraint system 2 attaches to wall 7 for support, limiting where cask 3 can be positioned in the nuclear power plant. The seismic cask stabilization device disclosed herein eliminates the need for seismic restraints altogether by ensuring that a cask will not tip over under even the most severe postulated earthquake at any land-based nuclear plant in the world. Moreover, the seismic cask stabilization device is free-standing and as such does not limit placement of the cask to a position near a wall.

Figure 2:
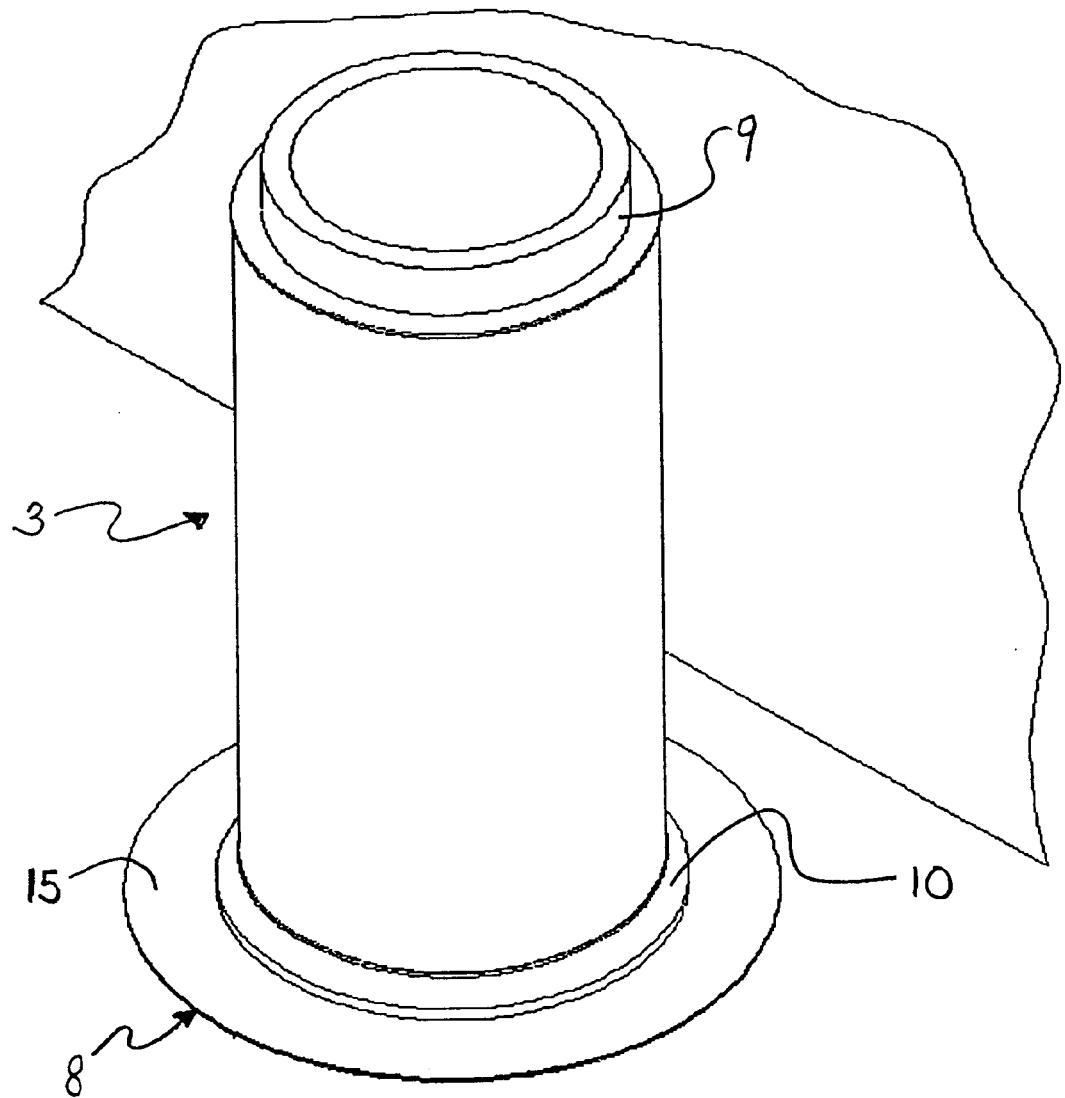
FIG. 2 illustrates a vertically oriented cask resting on the apparatus of the present invention, a seismic cask stabilization device.

FIG. 2 illustrates a vertically oriented cask 3 resting on seismic cask stabilization device 8. Seismic cask stabilization device 8 is a plate-like structure. Cask 3 has a top 9 and a base 10. In utilizing seismic cask stabilization device 8 to stabilize vertically oriented cask 3 during a seismic event, cask 3 is placed on seismic cask stabilization device 8 so that base 10 rests on top surface 15 of seismic cask stabilization device 8. In the illustrated embodiment, seismic cask stabilization device 8 is a circular plate. However, seismic cask stabilization device 8 can be another shape, for example rectangular.

Figure 3:
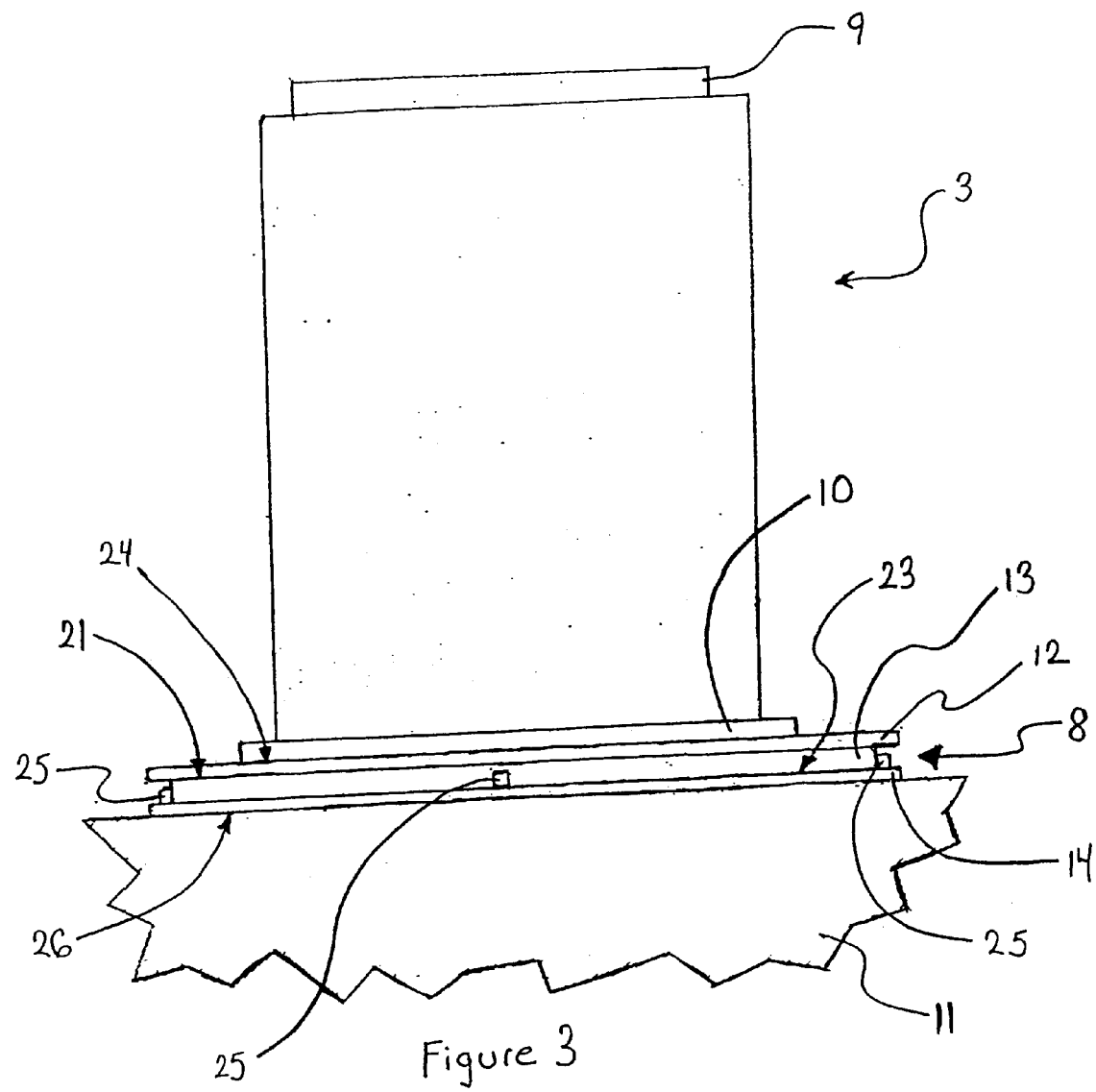
FIG. 3 is a side view of the seismic cask stabilization device with a cask resting thereon.

FIG. 3 is a side view of the preferred embodiment of seismic cask stabilization device 8 supporting cask 3 and in contact with the ground 11. In the illustrated embodiment, seismic cask stabilization device 8 comprises slide plate 12, lamina 13, and floor plate 14. However, seismic cask stabilization device 8 can comprise only slide plate 12 and lamina 13 and still perform its intended function of stabilizing vertically oriented cask 3 during seismic events. Slide plate 12 can be a cover plate suitable for supporting a cask. In the illustrated embodiment, slide plate 12 is a cover plate placed on top of lamina 13. As such, slide plate 12 will be referred to as cover plate 12 in the following discussion of the illustrated embodiment. Alternatively, base plate 10 can be modified to act as slide plate 12 by machining its bottom to a suitable finish. In this alternative embodiment, cover plate 12 would not be present.

Figure 4:
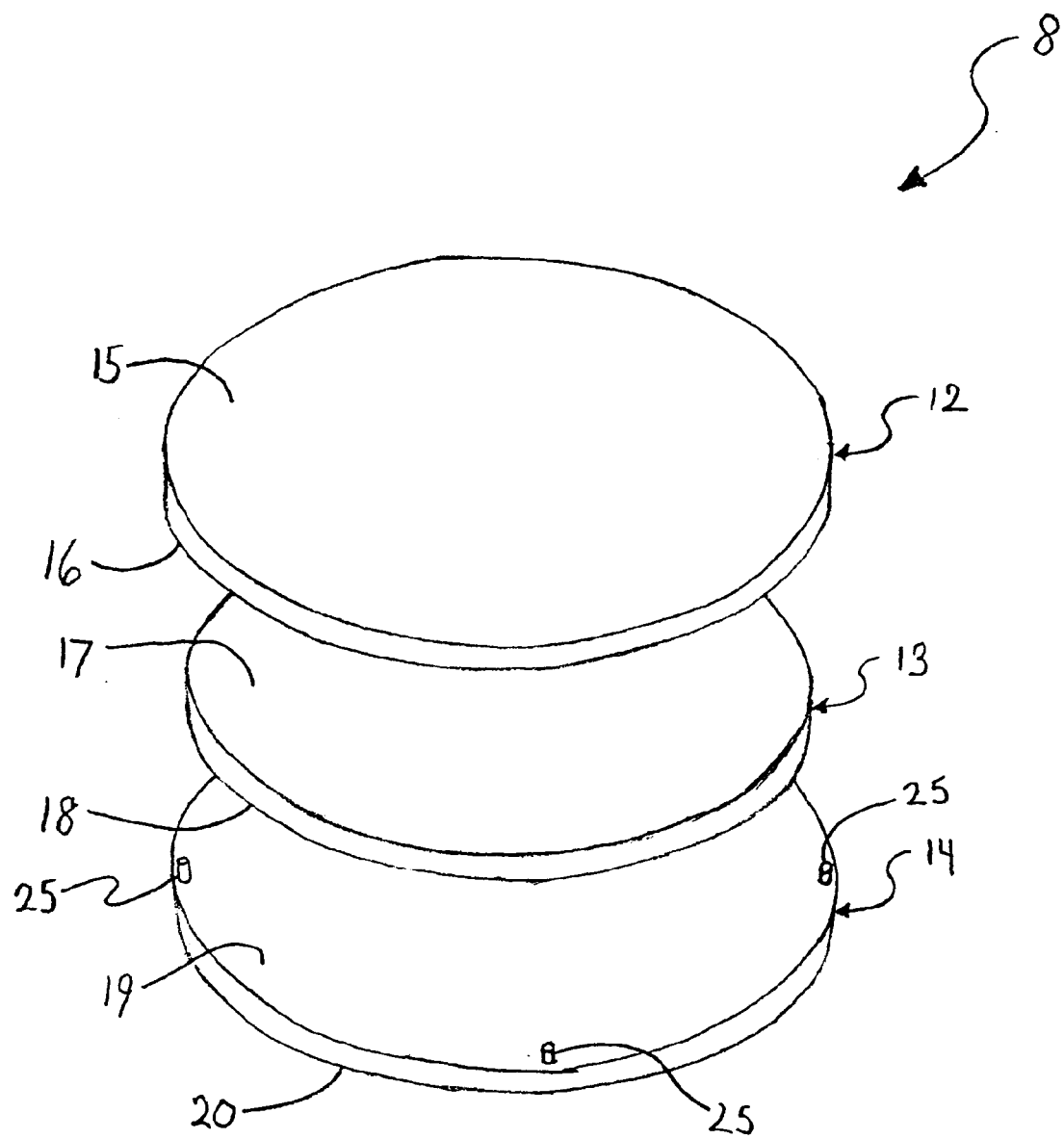
FIG. 4 is a side elevational exploded view of the seismic cask stabilization device.

Referring to FIGS. 3 and 4, cover plate 12 has a top surface 15 and a bottom surface 16. Lamina 13 has a top surface 17 and a bottom surface 18. Floor plate 14 has a top surface 19 and a bottom surface 20. Seismic cask stabilization device 8 is constructed so that bottom surface 16 of cover plate 12 is in contact with top surface 17 of lamina 13, forming slidable interface 21 having a coefficient of friction within a precisely defined range. As used herein, unless specified otherwise, the term "coefficient of friction" refers to both the coefficient of static friction and the coefficient of kinetic friction. Moreover, bottom surface 18 of lamina 13 is in contact with top surface 19 of floor plate 14, forming second interface 23. When placed on seismic cask stabilization device 8, base 10 of cask 3 contacts top surface 15 of cover plate 12, forming cask interface 24. Bottom surface 20 of floor plate 14 contacts ground 11, forming ground interface 26.

In the illustrated embodiment, the thickness of seismic cask stabilization device 8, measured from top surface 15 of cover plate 12 to bottom surface 20 of floor plate 14, is less than three inches. Moreover, if seismic cask stabilization device 8 only comprises cover plate 12 and lamina 13, the thickness can still be less than three inches, measured from top surface 15 of cover plate 12 to bottom surface 18 of lamina 13.

As is known in the art, when the surfaces of two solid objects are in contact with one another forming a surface interface, the lateral force necessary to cause relative motion between the objects (i.e. sliding) is proportional to the force which presses the surfaces of the objects together (i.e. the normal force) and the coefficient of friction. Assuming a given normal force, whether a lateral force will cause sliding at the surface interface is determined by the value of the coefficient of friction of that surface interface. The value of the coefficient of friction is determined by the type of materials the object surfaces are constructed of and the roughness of the surfaces. Assuming equal surface roughness, if one object is made of glass and the other object is made of steel, a different coefficient of friction will exist at the surface interface than if both objects were made of steel. By varying the materials of which the objects in contact with one another are constructed, one can change the coefficient of friction present at the surface interface, thus, controlling whether a particular lateral force will cause sliding at the interface. The present invention utilizes this phenomena.

Referring to FIG. 3 and applying this phenomena to the present invention, whether cover plate 12 slides with respect to lamina 13 at slidable interface 21 when subjected to lateral forces of a seismic event is determined by the value of the coefficient of friction at slidable interface 21. As stated above, the coefficient of friction can be varied by changing the materials of which cover plate 12 and lamina 13 are constructed. For purposes of this invention, surface roughness is not considered and all surfaces are assumed to be machined to a suitable finish. Thus, whether a given lateral force causes sliding at slidable interface 21 is controlled by changing the materials of which cover plate 12 and lamina 13 are constructed.

Preferably the only lateral movement (i.e. sliding) that occurs when seismic cask stabilization device 8 is supporting cask 3 and subjected to lateral forces resulting from seismic activity is at slidable interface 21. This is accomplished by restricting sliding at second interface 23, cask interface 24, and ground interface 26 (which may or may not be present depending on the embodiment of the invention). Restricting sliding at second surface 23 is accomplished in a substantially identical manner as restricting sliding at cask interface 24 and ground interface 26. As such, discussion will be limited to restricting sliding at second interface 23 with the understanding that the following discussion is applicable to cask interface 24 and ground interface 26.

Restricting sliding at second interface 23 can be accomplished by mechanically fastening lamina 13 to floor plate 14, providing a stopping means, such as pegs 25, or ensuring that the coefficient of friction of second interface 23 is greater than the coefficient of friction of slidable interface 21. While not shown in the illustrated embodiment, mechanically fastening lamina 13 to the floor plate 14 can consist of bolting lamina 13 and floor plate 14 together with bolts 30 (FIG. 8), clamping lamina 13 and floor plate 14 together, or providing an adhesive at second interface 23.

A stopping means can be employed in the form of pegs 25, or an elevated edge, to restrict sliding at second interface 23. For example, the pegs 25 can be secured to floor plate 14 and spaced so as to keep lamina 13 from sliding with respect to floor plate 14. The stopping means, if utilized, should be designed so as to leave a clearance between the stopping means and cover plate 12. This prevents interference with the desired sliding at slidable interface 21.

Alternatively, sliding is restricted at second interface 23 by ensuring that the coefficient of friction of second interface 23 is greater than the coefficient of friction of slidable interface 21. This can be accomplished by increasing the surface roughness of either bottom surface 18 of lamina 13 or top surface 19 of floor plate 14 when the cover plate 12 is constructed of the same material as floor plate 14. A second way of ensuring that the coefficient of friction of second interface 23 is greater than the coefficient of friction of slidable interface 21 is to construct floor plate 14 of a material different than cover plate 12 so that second interface 23 has a larger coefficient of friction than the coefficient of friction of slidable interface 21.

Sliding can be restricted at ground interface 26 by mechanically fastening floor plate 14 to ground 11 using floor anchors (not illustrated).

Seismic cask stabilization device 8 is constructed of materials so that the coefficient of friction of slidable interface 21 is within a particular range. This range is determined through analytic simulation as discussed below.

As stated earlier, if it is shown that cask 3 having a given weight, a given center of gravity, and given dimensions of base 10 (i.e. design parameters) would tip over in analytic simulation of the effects of a particular design basis earthquake, cask restrain system 2 (FIG. 1) is required. The same numerical simulation is used to evaluate the effects of the design basis earthquake on cask 3 when cask 3 is placed on seismic cask stabilization device 8. Seismic cask stabilization device 8 serves as a "vibration isolator" for cask 3 against the postulated design basis earthquake by allowing cask 3 to slide horizontally instead of tipping over. The simulation provides the time history of the net horizontal displacement of cask 3. The net horizontal displacement is the total horizontal distance that a marked position on cask 3 travels during simulation of the design basis earthquake.

Figure 5:
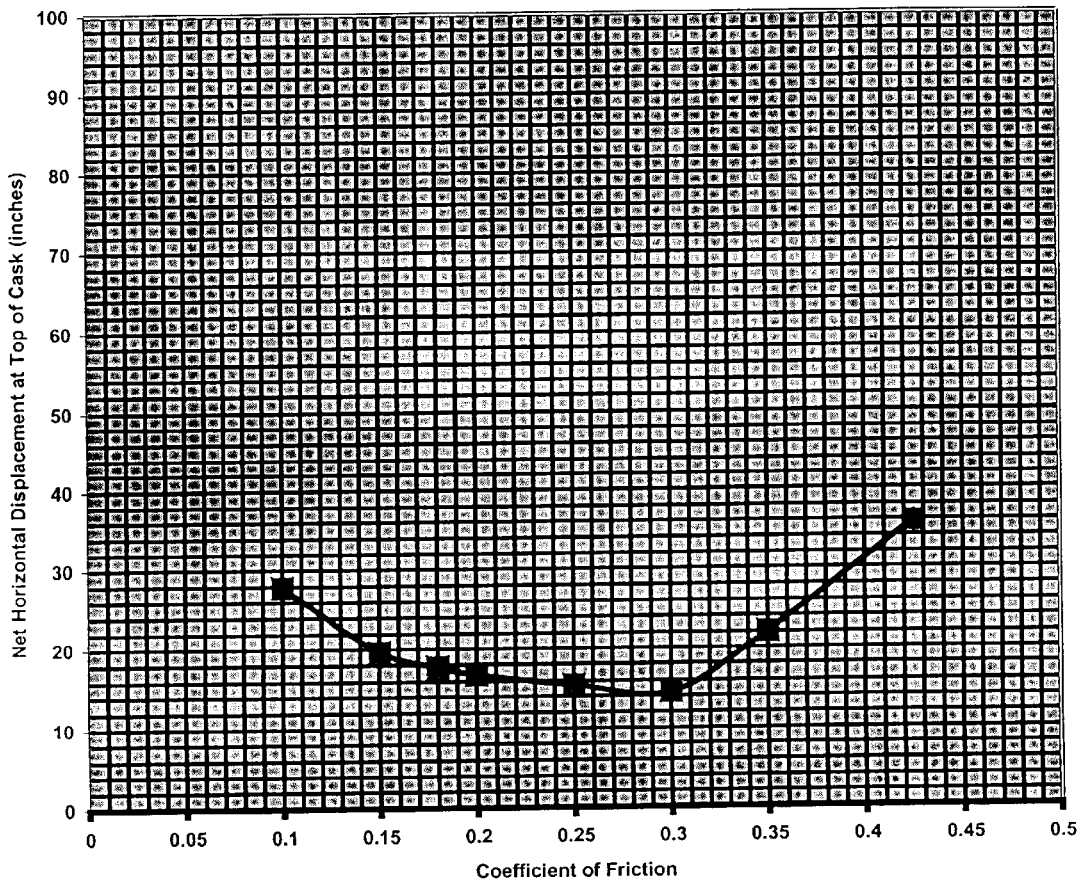
FIG. 5 is a graph of simulated data showing the net horizontal displacement of a cask placed on a seismic cask stabilization device under a design basis earthquake for varying coefficients of friction at a slidable interface.

The simulation is completed for cask 3 (having the same weight, location of center of gravity, and surface dimensions of base 10) for the same design basis earthquake conditions while varying the coefficient of friction of slidable interface 21. During the simulation, the net horizontal displacement of casks 3 for various coefficients of friction of slidable interface 21 is measured. The results of the simulation are then graphed, showing the net horizontal displacement for various coefficients of friction of slidable interface 21 (FIG. 5). It has been found that the shape of this "net horizontal displacement" v. "coefficient of friction" curve is approximately the same for simulations run for different conditions of the design basis earthquake and different design parameters of cask 3.

It has been found that if the coefficient of friction of slidable interface 21 is too high, cover plate 12 will not slide with respect to lamina 13 and the simulated design basis earthquake can result in cask 3 tipping over. However, if the coefficient of friction of slidable interface 21 is too low, sliding will occur too easily and the net horizontal displacement of cask 3 will be too great, hypothetically resulting in either cask 3 and cover plate 12 falling off seismic cask stabilization device 8 or cask 3 contacting a barrier such as a wall. Thus, the desired range of the coefficient of friction of the slidable interface 21 is that range where the coefficient of friction is low enough so that sliding will occur at slidable interface 21 rather than cask 3 tipping over when subjected to a specific design basis earthquake, yet high enough so that the net horizontal displacement of the cask is below an acceptable level of net horizontal displacement.

Figure 6:
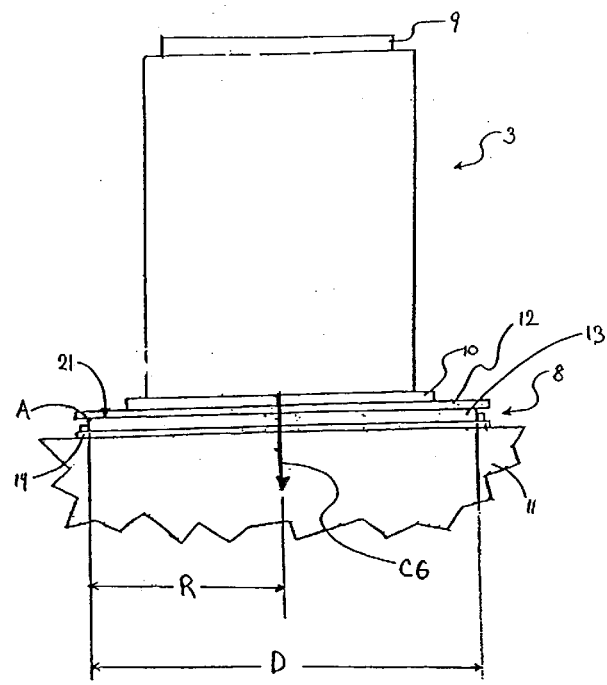
FIG. 6 is a side view of a cask centered on the seismic cask stabilization device showing the combined center of gravity of the cask and cover plate.
Figure 7:
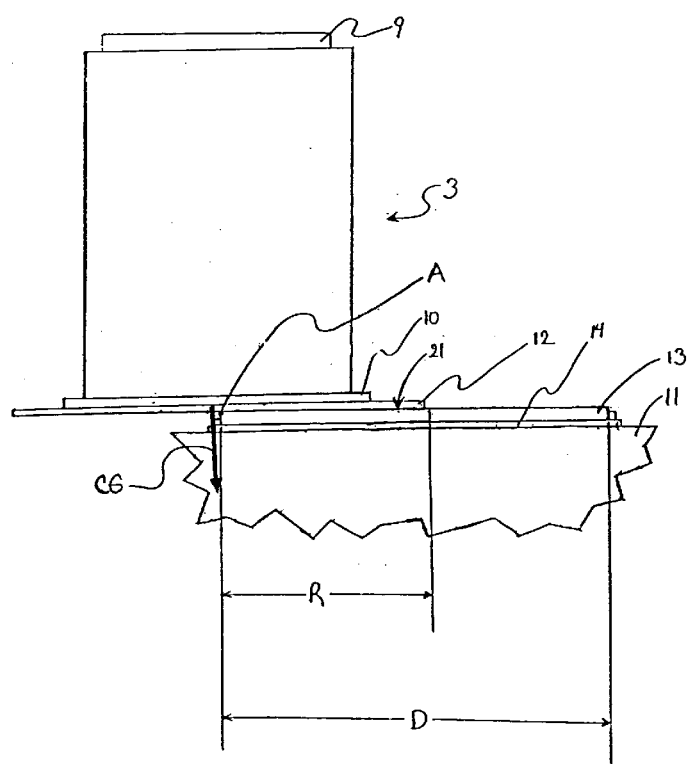
FIG. 7 is a side view of a cask on the seismic cask stabilization device where the cask and cover plate have slid so that their combined center of gravity is just outside the edge of the lamina.

What is an acceptable level of net horizontal displacement depends on the size of lamina 13 and the initial positioning of the combined center of gravity of cask 3 and cover plate 12. Referring to FIGS. 6 and 7, for example, assume that seismic cask stabilization device 8 is circular and cask 3 is cylindrical having circular bottom 10 (FIG. 2). Further assume that cask 3 is placed on cover plate 12 so that cask 3 is centered on cover plate 12, resulting in horizontal positioning of combined center of gravity CG. Lamina 13 has diameter D and a radius R. For this seismic cask stabilization device 8 and placement of cask 3 thereon, cask 3 (and cover plate 12) will be supported in an upright position by lamina 13 during sliding at slidable interface 21 until CG reaches a position just outside the edge A of lamina 13 (FIG. 6B). Once CG is outside lamina edge A, both cask 3 and cover plate 12 will tip off lamina 13. As such, the horizontal distance that CG can travel without cask 3 tipping off lamina 13 is R. Thus, a theoretical acceptable net horizontal displacement for this seismic cask stabilization device 8 is distance R. However, in practice, the acceptable net horizontal displacement will be decreased by a safety factor so that the acceptable net horizontal displacement is some distance less than R. The amount of safety factor reduction can be controlled either by government regulation standards or by a nuclear power plant owner's discretion. For example, for a cask having an 8 ft. diameter (and a theoretical acceptable net horizontal displacement of 4 ft.), the acceptable net horizontal displacement would be approximately 2–3 ft. in practice.

It should be noted that the acceptable net horizontal displacement for any cask stabilization device 8 can be determined using the above principles so long as the size and shape of lamina 13 are known and the horizontal position of combined center of gravity of cask 3 and cover plate 12 is also known.

Moreover, it is possible that lamina 13 is constructed so as to cover the entire floor area of a room in a nuclear power plant. In such a situation, it may be impossible for the horizontal position of the combined center of gravity CG of cask 3 and cover plate 12 to travel outside the edge of lamina 13 due to walls or other obstructions. In such a case, the theoretical acceptable net horizontal displacement is the distance that cask 3 and cover plate 12 can travel before contact with a wall or other obstruction occurs. However, as in the case above, this distance will then be decreased by some safety factor. As used in the claims, the term "acceptable net horizontal displacement" refers to the theoretical distance reduced by a safety factor.

Because, the shape of the net "horizontal displacement" vs. "coefficient of friction" curve is approximately the same for simulations using different design basis earthquakes and/or different design parameters of cask 3, the concepts discussed herein can be used to determine the desired range of coefficient of friction of slidable interface 21 for any cask at any geographic location in the world. What the range of coefficient of friction of slidable interface 21 can be for any given situation is a function of the cask's weight, the cask's location of center of gravity, the dimensions of the cask's base, and the particular design basis earthquake involved. As such, the present invention is not limited to the design basis earthquake conditions or cask design parameters used to produce the graph shown in FIG. 5, which is merely an example.

Referring to FIG. 5 as an example, assuming an acceptable net horizontal displacement for a particular situation is twenty inches, it can be seen from the simulated output data that this acceptable level of net horizontal displacement (below twenty inches) results when the coefficient of friction is in the range of 0.15 to 0.34. Thus, for the cask design parameters and design basis earthquake conditions simulated, the range of coefficient of friction of slidable interface 21 would be 0.15 to 0.34.

Once the range of coefficient of friction of slidable interface 21 is known, seismic cask stabilization 8 is constructed so that the coefficient of friction of slidable interface 21 is within the range. This is accomplished by constructing lamina 13 and cover plate 12 of materials that result in the coefficient of friction (both static and dynamic) of slidable interface 21 being within the range.

Preferably, lamina 13 is constructed of material whose interface coefficient of friction is below a specified plant-dependent minimum value and is known within a narrow and precise range. Also preferably, the material of which lamina 13 is constructed possesses a surface whose coefficient of friction is known with relative precision (±0.05). There are metallic or polymeric materials which fulfill this criteria and, therefore, qualify as suitable materials for lamina 13. Examples are Lubrite®, a material made by Lubrite® Technologies (www.lubritebearings.com) and Nylatron™, made by Extreme Materials (www.extrememarials.com).

Preferably, cover plate 12 and floor plate 14 are constructed of an environmentally competent metal such as austenitic stainless steel, wherein bottom surface 16 of cover plate 12 is machined to a suitable finish.

The foregoing discussion discloses and describes merely exemplary embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An apparatus comprising:
   a lamina;
   a slide plate in surface contact with the lamina, forming a slidable interface; and
   a spent nuclear fuel containment cask atop the slide plate;
   wherein the slide plate can move in any horizontal direction with respect to the lamina at the slidable interface so as to prevent tipping of the spent nuclear fuel containment cask under design basis earthquake conditions.

2. The apparatus of claim 1 wherein the slidable interface has a coefficient of friction within a range resulting in an acceptable level of net horizontal displacement of the cask under design basis earthquake conditions.

3. The apparatus of claim 1 wherein the slide plate is a base plate of the cask or a cover plate on which the cask is placed.

4. The apparatus of claim 1 wherein the slide plate is a cover plate positioned on top of the lamina, the apparatus further comprising a floor plate having a top surface, the top surface of the floor plate being in contact with a bottom surface of the lamina.

5. The apparatus of claim 4 wherein lateral movement of the lamina with respect to the floor plate is restricted.

6. The apparatus of claim 5 wherein the lateral movement of the lamina with respect to the floor plate is restricted by mechanically fastening the lamina to the floor plate or providing a stopping means.

7. The apparatus of claim 5 wherein the lateral movement of the lamina with respect to the floor plate is restricted by the floor plate and lamina forming an interface having a coefficient of friction greater than the coefficient of friction of the slidable interface.

8. The apparatus of claim 4 wherein lateral movement of the floor plate with respect to a surface upon which the apparatus is placed is restricted.

9. The apparatus of claim 8 wherein restricting the lateral movement of the floor plate with respect to the surface upon which the apparatus is placed is accomplished by mechanically fastening the floor plate to the surface upon which the apparatus is placed or providing a stopping means.

10. The apparatus of claim 8 wherein the lateral movement of the floor plate with respect to the surface upon which the apparatus is placed is restricted by the floor plate and surface upon which the apparatus is placed forming an interface having a coefficient of friction greater than the coefficient of friction of the slidable interface.

11. The apparatus of claim 1 wherein the slide plate is made of austenitic stainless steel and the lamina is constructed of a metallic or polymeric material.

12. The apparatus of claim 2 wherein the acceptable level of net horizontal displacement is 20 inches and the calculated range of coefficient of friction of the slidable interface is 0.15 to 0.34.

13. The apparatus of claim 1 wherein the thickness of the apparatus is less than three inches.

14. The apparatus of claim 1 wherein the slide plate and the lamina are rectangular.

15. The apparatus of claim 1 wherein the slide plate and the lamina are circular.

16. The apparatus of claim 1 wherein the slide plate is a cover plate positioned on top of the lamina; the cask placed atop the cover plate; and wherein lateral movement of the cask with respect to the cover plate is restricted.

17. The apparatus of claim 16 wherein the lateral movement of the cask with respect to the cover plate is restricted by mechanically fastening the cask to the cover plate, providing a stopping means, or ensuring that a coefficient of friction between the cask and cover plate is greater than the coefficient of friction of the slidable interface.

18. A method of stabilizing a cask during seismic events comprising:

providing an apparatus comprising a lamina and a slide plate in surface contact with the lamina, forming a slidable interface, wherein the slide plate can move in any horizontal direction with respect to the lamina at the slidable interface; and positioning a spent nuclear fuel containment cask having a bottom and a top on the apparatus so as to prevent tipping of the spent nuclear fuel containment cask under design basis earthquake conditions.

19. The method of claim 18 wherein a calculated range of coefficient of friction for the slidable interface is determined for an acceptable level of net horizontal displacement of the cask under design basis earthquake conditions.

20. The method of wherein claim 19 the acceptable level of net horizontal displacement is 20 inches and the calculated range of coefficient of friction is 0.15 to 0.34.

* * * * *